United States Patent [19]

Neri

[11] Patent Number: 5,160,467
[45] Date of Patent: Nov. 3, 1992

[54] METHOD FOR PRODUCING BIODEGRADABLE PACKAGING MATERIAL

[75] Inventor: Michael A. Neri, Rochester, N.Y.

[73] Assignees: Joseph R. DeGeorge, New York; William J. Every, Rochester, both of N.Y.

[21] Appl. No.: 802,534

[22] Filed: Dec. 5, 1991

[51] Int. Cl.$^5$ ............................................. B29C 71/00
[52] U.S. Cl. ......................................... 264/101; 264/344
[58] Field of Search ................................. 264/101, 344

[56] References Cited

U.S. PATENT DOCUMENTS

| | | | |
|---|---|---|---|
| 3,798,337 | 3/1974 | Abalo | 264/101 X |
| 4,035,951 | 7/1977 | Dedolph | 264/101 X |
| 4,362,680 | 12/1982 | Kobayashi et al. | 264/101 X |
| 4,664,857 | 5/1987 | Nambu | 264/101 X |
| 4,774,957 | 10/1988 | Nambu et al. | 264/101 X |
| 4,814,120 | 3/1989 | Huc et al. | 264/101 X |
| 4,925,603 | 5/1990 | Nambu | 264/101 X |
| 4,992,220 | 2/1991 | Neri et al. | 264/28 |
| 5,076,983 | 12/1991 | Loomis et al. | 264/101 |

FOREIGN PATENT DOCUMENTS 347208  9/1972  U.S.S.R. ............................. 264/101

Primary Examiner—Karen Aftergut
Attorney, Agent, or Firm—Shlesinger, Fitzsimmons & Shlesinger

[57] ABSTRACT

An improved method for production of a biodegradable packaging material which entails dissolving gellable polysaccharides in water, molding the solution into any desired shape or form, and then vacuum-dehydrating the molded solution to produce the desired product. This improved method reduces the number of steps required to produce the biodegradable packaging material, and therefore provides for a product which is less expensive to produce and possibly more competitive with non-biodegradable packaging materials currently found in today's marketplace.

8 Claims, No Drawings

METHOD FOR PRODUCING BIODEGRADABLE PACKAGING MATERIAL

BACKGROUND OF THE INVENTION

This invention relates to packaging material, and more particularly to a packaging material which, upon being disposed, will degrade over a relatively brief period of time once exposed to the elements—i.e., water, bacteria, fungi, etc. More particularly this invention relates to an improved process for producing such packaging material.

In recent years, it has become increasingly desirable for both individuals and businesses to decrease their threat to the environment by recycling solid wastes such as paper, certain plastics, glass and aluminum. In an effort to further reduce the volume of solid waste, businesses and individuals may also elect to substitute recyclable materials, such as paper and cardboard, for the non-biodegradable, non-recyclable polymers currently being used as packaging materials. Unfortunately, this option is seldom chosen due to the obvious increase in costs, and as a result, continued use of plastics and other non-biodegradable polymers is becoming a most serious burden to not only waste disposers and landfills, but more importantly, to our planet as a whole.

Numerous efforts have been made to alleviate this growing problem through the development of biodegradable materials which can be substituted in place of the heretofore non-biodegradable polymers so often employed for packaging materials such as wrapping films, containers, fillers, and the like. U.S. Pat. No. 3,921,333, for example, suggests that the problem can be at least partially solved by using synthetic plastic materials such as thermoplastic polymers which are biodegradable.

The U.S. Pat. No. 4,312,979 discloses various methods for preparing polysaccharides by extracellular cultivation from the genus Pseudonomas in a nutrient medium. Although the patent does not disclose or teach the production of a packaging material, it does suggest that polysaccharides can be used as moldable materials for biodegradable films, as well as for other purposes.

U.S. Pat. No. 4,472,542 discloses a hydrogel produced as a result of dissolving a gel in a polyvinyl alcohol and partially dehydrating the gel solution by means of a freeze-drying process. The resulting product, however, remains as a semisolid gel and is therefore unsuitable for use as a packaging material. In my prior U.S. Pat. No. 4,992,220, I disclosed a novel method for producing biodegradable packaging material in any molded shape or form. This process involved forming a gel mold by dispersing a natural polysaccharide extract in water, freezing the molded gel, and then freeze-drying the molded gel to produce a lightweight material similar in consistency to urethane foam. This method, however, is subject to excessive costs due to separate freezing and freeze-drying stages, operation of their separate apparatus and handling therebetween.

Accordingly, one object of this invention is to provide an improved method of producing a biodegradable packaging material from a gelable plant and/or animal extract.

Another object of this invention is to provide a less expensive method of producing a biodegradable packaging material from a gelable plant and/or animal extract.

Also, a more specific object of this invention is to provide a less costly biodegradable packaging material which may offer a more desirable alternative to non-biodegradable packaging materials.

Other objects of this invention will be apparent hereinafter from the specification and from the recital of the appended claims.

SUMMARY OF THE INVENTION

The improved biodegradable packaging material is produced by dissolving a gelable plant or animal extract, such as agar-agar in boiling or near boiling water, and pouring the solution, while in liquid state, into one or more molds having the desired shape of the packaging material that is to be produced. The molded solutions are allowed to cool and gel within the mold without freezing, after which they are subjected to low pressure conditions in a vacuum chamber for the purpose of removing substantially all moisture from the molded gel. Depending upon the gel strength and the desired shape of the final product, the gel may be removed from the mold either before or after the dehydration process. Regardless, the resulting material will constitute a biodegradable packaging material which is very light and has the consistency of, for example, urethane foam.

PREFERRED EMBODIMENT OF THE INVENTION

By way of example, a quantity of agar is added to boiling water in the ratio of two grams of agar-agar to 100 milliliters of boiling water. The mixture is then stirred or otherwise mixed until the agar-agar has dissolved in the boiling water and the resulting solution, while still in a liquid state, is then poured into one or more molds. The mold cavities may be approximately in the shape of a sphere or cube, or may have any other desired configuration. After the solution has cooled and gelled within the mold or molds, and is thus capable of retaining its molded shape, the gels are removed from the molds and without being frozen are placed in a vacuum chamber.

The vacuum chamber of a conventional water-ring vacuum pump will volatize the water retained in each molded gel and subsequently evacuate the water vapor from the chamber. The molded gels are subjected to this environment until each is substantially free of retained water. The resulting vacuum dehydrated products will retain their molded configurations upon pressure equalization and they will be extremely light in weight, having a consistency generally similar to that of a urethane foam.

From the above example it should be noted that any strong gel, so classified due to its characteristic high bloom factor, may be used to obtain similar results. Strong gels may be selected from the group comprising agar-agar, satiagel and aubygel. Also, instead of using two grams of a strong gel, alternatively a mixture of one gram of a strong gel selected from the above-mentioned group and one gram of a weak gel selected from the group comprising satiaxane and both low refined grades and refined grades of gelatins 50 bloom, 75 bloom, 100 bloom and 200 bloom, may also be used. A third alternative is to use two grams of only a weak gel, which due to the consistencey of the gel requires that the solution remain in the mold during the dehydration process, otherwise the gel will not retain it's shape.

Depending upon the desired density of the final product, the weight ratio of the dissolved gelling agent or agents to water can be varied without departing from this invention. That is to say, that the greater the amount of gelling agent(s) dissolved in a given amount of water, then greater will be the density of the vacuum dehydrated product, and vice versa.

The above-noted vacuum dehydrated products are biodegradable following a period of exposure to water and microorganisms that are abundantly found in our environment. Moreover, the vacuum dehydrated packaging material disclosed herein exhibits fire retardant properties.

From the foregoing it will be apparent that the present invention provides a relatively simple and inexpensive packaging material, which has the advantage, as compared to existing plastic packaging materials, that it will tend to degrade when disposed of in such manner that it will be exposed to the aforementioned degradative elements. By vacuum dehydrating the gels, the packaging material is rendered not only biodegradable, but also extremely light in weight, which qualifies it as a particularly suitable choice for protecting against package damage during transportation. Also, in comparison to our prior method of production this improved method is less costly because the steps of freezing the molded gel and then freeze-drying the molded gel are not performed and, therefore, the product, due to deflated sales process, may be better able to compete with the conventional non-biodegradable polymeric packaging materials found in today's marketplace.

While this invention has been described in connection with only certain gelling agents, particularly polysaccharide gums, it is to be understood that similar such biodegradable gelling agents can be employed without departing from the scope of this invention. Also, while this invention has been described in connection with a water-ring vacuum pump, it is to be understood that similar vacuum chambers having a pump intended to be used with water can be employed without departing from the scope of this invention. Moreover, while this invention has been described in connection with only certain embodiments thereof it will be apparent that it is capable of still further modification, and that this application is intended to cover any such modifications as may fall within the scope of one skilled in the art or the appended claims.

I claim:

1. A method for producing a vacuum-dehydrated, light-weight biodegradable packaging product, comprising boiling a quantity of water,
   mixing a quantity of at least one gellable polysaccharide with said quantity of boiling water to form a moldable solution,
   pouring said solution into at least one mold and allowing said solution to cool, thereby forming a semi-solid mixture, and
   without freezing subjecting said semi-solid mixture to a vacuum-dehydration process to volatize all moisture therefrom, and to produce a biodegradable product which retains its molded configuration upon returning to normal atmospheric pressure.

2. A method as defined in claim 1, wherein said at least one gellable polysaccharide is selected from the group consisting of plant extracts and animal extracts.

3. A method as defined in claim 2, wherein said plant extracts are selected from the group consisting of agar-agar, satiagel, aubygel, lygonome and satiaxane.

4. A method as defined in claim 2, wherein said animal extracts are selected from the group consisting of refined grades of gelatins 50 bloom, 75 bloom, 100 bloom and 200 bloom.

5. A method as defined in claim 1, wherein a weight ratio of said quantity of water to said quantity of said at least one gellable polysaccharide is about 50:1.

6. A method as defined in claim 5, wherein said weight ratio is increased or decreased to achieve a desired density of said biodegradable product.

7. A method as defined in claim 1, wherein at least fifty percent, by weight, of said quantity of said at least one gellable polysaccharide has a high bloom factor.

8. A method as defined in claim 2, wherein said animal extracts are selected from the group consisting of low refined grades of gelatins 50 bloom, 75 bloom, 100 bloom and 200 bloom.

* * * * *